United States Patent
Hashimoto et al.

(10) Patent No.: US 6,382,939 B2
(45) Date of Patent: May 7, 2002

(54) RECIPROCATING COMPRESSOR IN WHICH A SUCTION VALVE IS PREVIOUSLY BENT TO OPEN A SUCTION PORT WHEN THE COMPRESSOR IS STOPPED

(75) Inventors: Kenji Hashimoto; Yoshito Matsumura, both of Gunma; Yoshinobu Ichikawa, Maebashi; Taizo Sato, Isesaki, all of (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 09/759,260

(22) Filed: Jan. 16, 2001

(30) Foreign Application Priority Data

Jan. 17, 2000 (JP) ........................................ 2000-008013

(51) Int. Cl.$^7$ .............................................. F04B 39/10
(52) U.S. Cl. ....................................................... 417/569
(58) Field of Search .................................. 417/569, 571; 137/855, 856

(56) References Cited

U.S. PATENT DOCUMENTS

| | | | |
|---|---|---|---|
| 4,039,270 A | | 8/1977 | Hiraga |
| 4,330,999 A | * | 5/1982 | Nakayama .................. 417/295 |
| 4,749,340 A | | 6/1988 | Ikeda et al. |
| 5,249,939 A | | 10/1993 | Takahashi |
| 5,267,839 A | * | 12/1993 | Kimura et al. ............... 417/269 |
| 5,586,874 A | * | 12/1996 | Hashimoto et al. .......... 137/521 |
| 5,603,611 A | | 2/1997 | Tarutani et al. |
| 5,607,287 A | * | 3/1997 | Ikeda et al. .................. 417/269 |
| 5,632,609 A | * | 5/1997 | Hashimoto .................... 137/856 |
| 5,647,395 A | * | 7/1997 | Hashimoto et al. .......... 137/514 |
| 5,655,898 A | * | 8/1997 | Hashimoto et al. .......... 137/855 |
| 5,688,111 A | * | 11/1997 | Takai ........................... 417/270 |
| 5,848,882 A | * | 12/1998 | Hashimoto et al. .......... 137/856 |
| 6,026,721 A | | 2/2000 | Fukai |

FOREIGN PATENT DOCUMENTS

| | | |
|---|---|---|
| EP | 0522745 | 1/1993 |
| EP | 0874155 | 10/1998 |
| FR | 1533035 | 7/1967 |
| JP | 5332881 | 8/1978 |
| JP | 335899 | 7/1991 |

* cited by examiner

Primary Examiner—Teresa Walberg
Assistant Examiner—Vinod D Patel
(74) Attorney, Agent, or Firm—Baker Botts L.L.P.

(57) ABSTRACT

In a reciprocating compressor in which a suction valve (21) of a leaf valve is placed between a valve plate (16) and a cylinder block (12) to open and close a suction port (18) formed in the valve plate, the suction valve is previously bent to open the suction port in an initial state when the compressor is stopped. The cylinder block has a cylinder bore (11) with which the suction port is communicated and into which a piston (17) is inserted. When the piston performs reciprocating movement in the cylinder bore, the suction valve opens and closes the suction port in response to the reciprocating movement in a pulsation reducing manner.

8 Claims, 3 Drawing Sheets

RECIPROCATING COMPRESSOR IN WHICH A SUCTION VALVE IS PREVIOUSLY BENT TO OPEN A SUCTION PORT WHEN THE COMPRESSOR IS STOPPED

BACKGROUND OF THE INVENTION

This invention relates to a reciprocating compressor for compressing a gas by the reciprocating movement of a piston and, in particular, to a structure of a suction path for sucking the gas into a cylinder bore.

There are known various types of reciprocating compressors such as a fixed displacement compressor comprising a swash plate having a fixed inclination angle, a variable displacement compressor comprising a swash plate having a variable inclination angle, and so on. Each of these compressors comprises a cylinder block having a plurality of cylinder bores extending in a predetermined direction, a plurality of pistons inserted into the cylinder bores, respectively, a cylinder head disposed at one end of the cylinder block in the predetermined direction, and a valve plate assembly interposed between the cylinder block and the cylinder head.

The valve plate assembly comprises a valve plate with a plurality of discharge valves and a plurality of suction valves fixed to opposite surfaces thereof. The valve plate has a plurality of discharge ports and a plurality of suction ports corresponding to the cylinder bores, respectively. Each of the discharge valves and the suction valves is a leaf valve having a fixed end and a free end in the manner known in the art. The discharge valves and the suction valves are attached to the valve plate to close the discharge ports and the suction ports, respectively. Following the reciprocating movement of the pistons, the discharge valves and the suction valves open and close the discharge ports and the suction ports, respectively. The cylinder block is provided with a plurality of stoppers each of which is engaged with the free end of each of the suction valves to limit a maximum bending of the suction valve (for example, see Japanese Examined Utility Model Publications (Y) No. H03-35899 and S53-32881).

Each of the suction valves is operated in the following manner. When no load is applied, the suction valve is substantially brought into contact with the valve plate. When the piston is moved away from the valve plate, a bore pressure within the cylinder bore is lowered. In this event, if the sum of the bore pressure acting upon the suction valve, a bending stress of the suction valve, and a viscous force of a lubricating oil between the suction valve and the valve plate becomes lower than an internal pressure of the cylinder head, the free end of the suction valve is separated or released from the valve plate to be opened. On the other hand, when the piston is moved towards the valve plate, the bore pressure is elevated. In this event, if the above-mentioned sum becomes higher than the internal pressure of the cylinder head, the free end of the suction valve is brought into contact with the valve plate to be closed.

In the above-mentioned structure, an open timing of the suction valve is delayed due to the bending stress of the suction valve and the viscous force of the lubricating oil between the suction valve and the valve plate. Accordingly, simultaneously with the suction valve's opening after delay, a refrigerant is abruptly sucked because the bore pressure is considerably decreased at that time instant. This results in an increase in pulsation of suction flow. If a cooling load within a car compartment is reduced so that a sucking amount of the refrigerant is reduced, the bending of the suction valve is reduced so that the free end of the suction valve can not be brought into contact with the stopper. In this event, self-induced vibration is caused in the suction valve. This results in an increase in pulsation of suction flow and in generation of a noise.

SUMMARY OF THE INVENTION

It is therefore an object of this invention to provide a reciprocating compressor in which pulsation of suction flow of a refrigerant can be reduced effectively and without inducing other vibration and which can be produced at a reduced cost.

Other objects of this invention will become clear as the description proceeds.

According to an aspect of this invention, there is provided a reciprocating compressor which comprises a cylinder block having a cylinder bore, a piston inserted into the cylinder bore to perform reciprocating movement, a valve plate coupled to the cylinder block and having a suction port communicated with the cylinder bore, and a suction valve of a leaf valve placed between the valve plate and the cylinder block for opening and closing the suction port in response to the reciprocating movement of the piston. In the reciprocating compressor, the suction valve is previously bent to open the suction port in an initial state when the compressor is stopped.

According to another aspect of this invention, there is provided a reciprocating compressor which comprises a cylinder block having a plurality of cylinder bores, a plurality of pistons inserted into the cylinder bores to perform reciprocating movements, respectively, a valve plate coupled to the cylinder block and having a plurality of suction ports communicated with the cylinder bores, respectively, and a plurality of suction valves of leaf valves placed between the valve plate and the cylinder block for opening and closing the suction ports in response to the reciprocating movements of the pistons, respectively. In the reciprocating compressor, the suction valves are previously bent towards the stoppers to open the suction ports, respectively, in an initial state when the compressor is stopped. The pistons perform the reciprocating movements with a predetermined phase difference from one another.

DESCRIPTION OF THE PREFERRED EMBODIMENT

Figure 1:
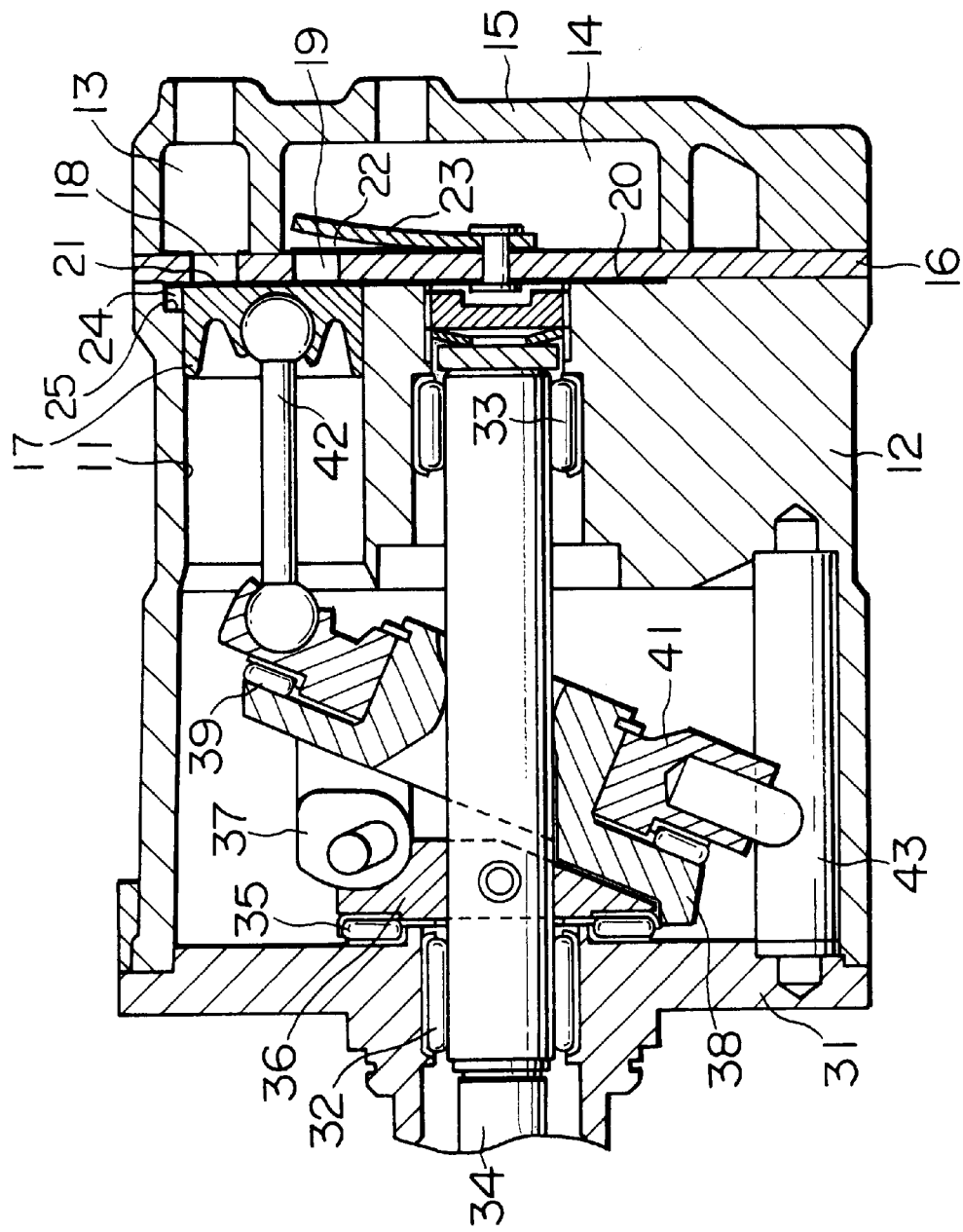
FIG. 1 is a vertical sectional view of a reciprocating compressor according to an embodiment of this invention.

Referring to FIG. 1, description will be made of a reciprocating compressor according to an embodiment of this invention.

The reciprocating compressor illustrated in the figure is called a wobble-plate variable displacement compressor and used in an automobile air conditioner to compress a refrigerant. The reciprocating compressor comprises a cylinder block 12 having a plurality of or seven cylinder bores (only one being illustrated) 11 extending in a predetermined direction, a cylinder head 15 arranged at one end of the cylinder block 12 in the predetermined direction and defining a suction chamber 13 and a discharge chamber 14, a valve plate 16 interposed between the cylinder block 12 and the cylinder head 15, and a plurality of or seven pistons 17 inserted into the cylinder bores 11, respectively, to perform reciprocating movement. The cylinder bores 11 are arranged in a circumferential direction. The valve plate 16 has a plurality or seven suction ports 18 and a plurality of or seven discharge ports 19 corresponding to the cylinder bores 11, respectively. The suction ports 18 are connected to the suction chamber 13 while the discharge ports 19 are connected to the discharge chamber 14.

The reciprocating compressor further comprises a front housing 31 fixed to the other end of the cylinder block 12 in the predetermined direction, a drive shaft 34 rotatably supported by the cylinder block 12 and the front housing 31 through radial bearings 32 and 33, respectively, to be driven and rotated, a rotor 36 fixed to the drive shaft 34 to face the front housing 31 through a thrust bearing 35, a swash plate 38 coupled to the rotor 36 through a hinge mechanism 37, and a wobble plate 41 rotatably supported by the swash plate 38 through a bearing 39. By the hinge mechanism 37, the swash plate 38 is rotated together with the rotor 36 at a variable inclination angle with respect to the drive shaft 34. The wobble plate 41 is connected at its periphery to the pistons 17 through piston rods 42, respectively. A guide 43 is fixed between the cylinder block 12 and the front housing 31 to lock the rotation of the wobble plate 41.

When the drive shaft 34 is driven and rotated, for example, by an engine of a car, the rotor 36 and the swash plate 38 are rotated. Since the rotation of the wobble plate 41 is locked by the guide 43, the wobble plate 41 is not rotated but wobbled in response to the inclination of the swash plate 38. As a consequence, the pistons 17 perform reciprocating movement within the cylinder bores through the piston rods 42, respectively. Since the stroke of each piston 17 is varied in dependence upon the inclination of the swash plate 38, the compression volume is variable.

Figure 2:
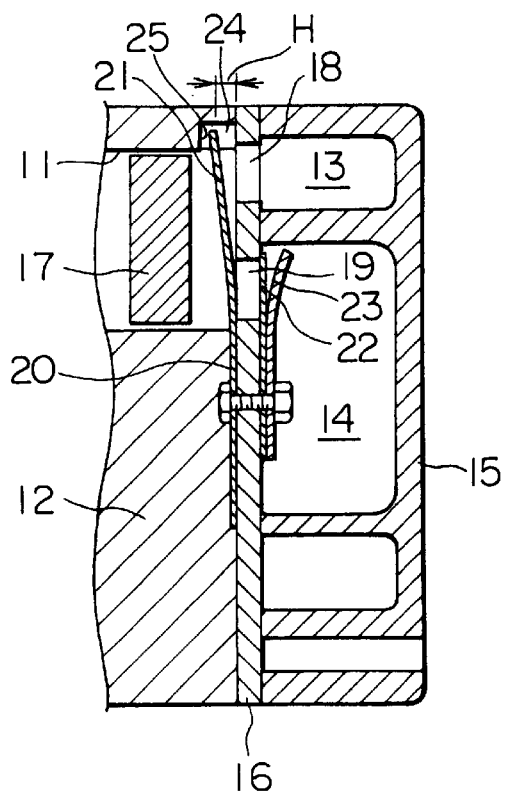
FIG. 2 is a schematic sectional view for describing a characteristic part of the reciprocating compressor illustrated in FIG. 1.

Referring to FIG. 2 in addition to FIG. 1, description will further be continued.

Figure 3:
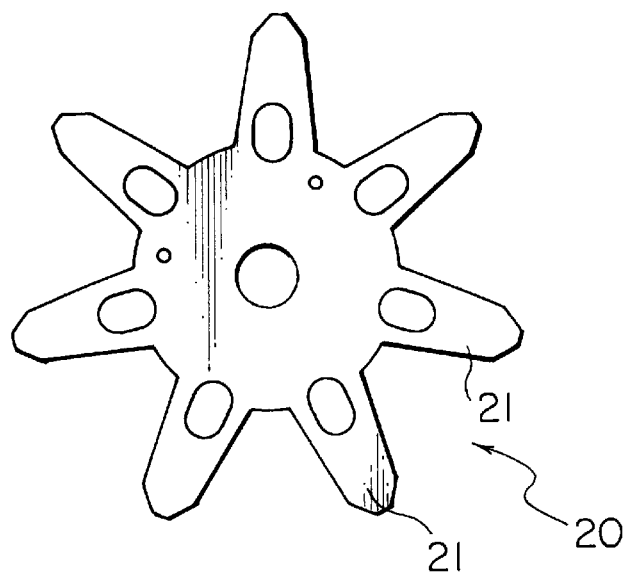
FIG. 3 is a plan view of a valve member comprising a suction valve in the reciprocating compressor illustrated in FIG. 1.

On the side of the cylinder block 12, the valve plate 16 is provided with a valve member 20 having a shape illustrated in FIG. 3. The valve member 20 has a plurality of suction valves 21 faced to the suction ports 18 in one-to-one correspondence. On the side of the cylinder head 15, the valve plate 16 is provided with a plurality of discharge valves 22 faced to the discharge ports 19 in one-to-one correspondence and a plurality of retainers 23 for preventing the discharge valves 22 from being excessively bent, respectively. Each of the suction valves 21 and the discharge valves 22 is a leaf valve having a fixed end and a free end.

The cylinder block 12 is provided with a plurality of recessed portions 24 formed in its end surface on the side of the valve plate 16 and connected to the cylinder bores 11, respectively. Each of the recessed portions 24 forms a stopper 25 for limiting a maximum bending of each of the suction valves 21.

Each of the suction valves 21 is shaped to be slightly bent or deflected towards the piston 17. As a result, the free end of the suction valve 21 is separated or released from both of the valve plate 16 and the stopper 25 when the compressor is stopped, i.e., when the suction valve 21 is subjected to no force. The distance H between the valve plate 16 and the free end of the suction valve 21 will later be described.

When the compressor is operated and each of the pistons 17 performs reciprocating movement, a refrigerant gas is compressed within the cylinder bore 11 to increase a gas pressure within the cylinder bore 11. Following the increase in gas pressure within the cylinder bore 11, the suction valve 21 is brought into press contact with the valve plate 16 to close the suction port 18. Thus, the suction valve 21 keeps the suction port 18 opened when the compressor is stopped. On the other hand, when the compressor is operated, the suction valve 21 opens the suction port 18 in a suction stroke of the piston 17 and closes the suction port 18 in a discharge stroke with the discharge port 19 opened.

After completion of the discharge stroke, the piston 17 moves away from the valve plate 16. Then, the gas pressure within the cylinder bore 11 is lowered so that the suction valve 21 is opened. At this time, the suction valve 21 is opened with a smaller delay than the conventional compressor because the flexural rigidity of the suction valve 21 acts in an opposite direction to help opening. Therefore, the conventional pulsation problem due to the suction valve's opening delay can be solved. In addition, even under a low load when the refrigerant flow rate is small, the suction valve 21 is fully opened because of the rigidity of the suction valve 21 to be brought into contact with the stopper 25. Therefore, occurrence of self-induced vibration is prevented. It is noted here that the cooling ability is decreased because of a delay in closing the suction valve 21 due to the flexural rigidity thereof. However, the above-mentioned decrease in cooling ability is cancelled by the reduction of the delay in opening the suction valve 21 and therefore causes no serious problem. Specifically, in case where the refrigerant flow rate is extremely small under a low load, the delay in closing the suction valve becomes great to decrease the performance. However, this does not result in any serious problem because high performance is not required under such a low load.

Figure 4:
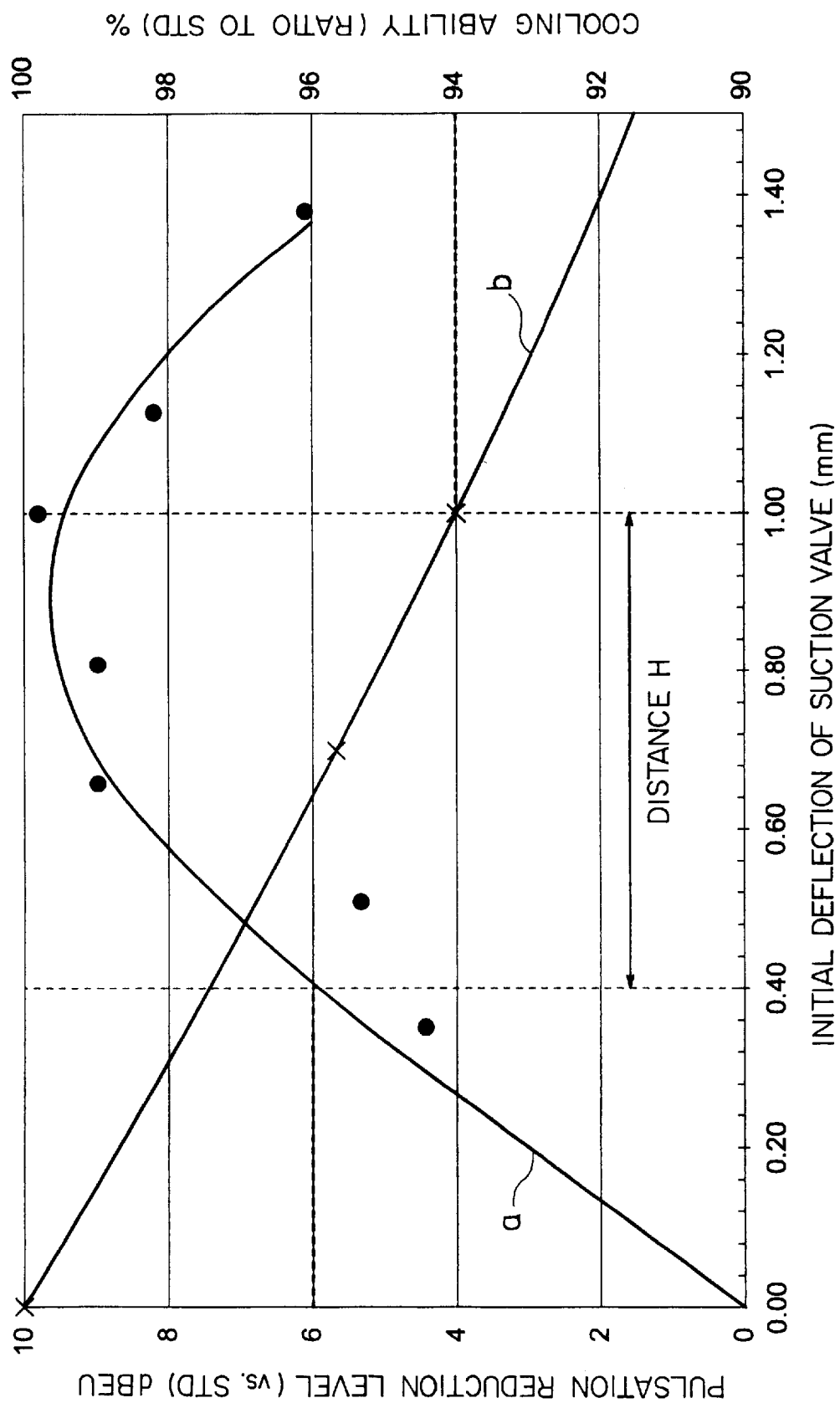
FIG. 4 is a graph for describing relations of pulsation reduction/cooling ability and a distance between a valve plate and an end of the suction valve in the reciprocating compressor illustrated in FIG. 1.

Referring to FIG. 4, description will be made of the distance H between the valve plate 16 and the suction valve 21. It is assumed here that the refrigerant flow rate is equal to 50 kg/h and that the vibration frequency component of 500 Hz is desired to be effectively suppressed. The distance H corresponds to an initial deflection of the suction valve 21. A curve a along black circles in the figure represents the change in pulsation reduction level with respect to the initial deflection of the suction valve 21. On the other hand, a straight line b along symbols x represents the change in cooling ability with respect to the initial deflection of the suction valve 21. It is desired that the pulsation reduction level is not smaller than 6 dBEU. If it is smaller than 6 dBEU, the effect of reducing the pulsation is insufficient and is not noticeable. On the other hand, there is a technical demand that the reduction in cooling ability must not exceed the lower limit of 94%. Taking the above into consideration, the initial deflection of the suction valve 21, i.e., the distance H is selected within a range between 0.4 and 1.0 mm, as seen from FIG. 4.

In the reciprocating compressor mentioned above, it is possible to suppress the pulsation of suction flow that has been occurring conventionally as a result of delay in opening the suction valve 21. The suction valve 21 has the initial state in which its free end is readily brought into contact with the stopper. So, the opening delay of the suction valve is effectively decreased. Furthermore, even if the refrigerant has a low flow rate, the free end of the suction valve 21 is brought into contact with the stopper 25. Therefore, it is possible to prevent occurrence of self-induced vibration, the pulsation of suction flow resulting from the self-induced vibration, and occurrence of a noise. Since the deflection of the suction valve 21 can be selected within a predetermined range, it is possible to avoid the increase in production cost due to strict adjustment of the deflection.

While the present invention has thus far been described in connection with a single embodiment thereof, it will readily be possible for those skilled in the art to put this invention into practice in various other manners. In the foregoing, description has been made about the variable displacement compressor. However, this invention is also applicable to the fixed displacement compressor. Although the compressor has seven cylinder bores in the foregoing embodiment, the number of the cylinder bores is not restricted thereto. It is a matter of course that this invention is applicable to a swash-plate type compressor known in the art.

What is claimed is:

1. A reciprocating compressor comprising:

a cylinder block having a cylinder bore;

a piston inserted into said cylinder bore to perform reciprocating movement;

a valve plate coupled to said cylinder block and having a suction port communicated with said cylinder bore; and a suction valve of a leaf valve placed between said valve plate and said cylinder block for opening and closing said suction port in response to said reciprocating movement of the piston, said suction valve being previously bent to open said suction port in an initial state when said compressor is stopped.

2. A reciprocating compressor as claimed in claim 1, wherein said suction valve has a free end spaced from said valve plate by a distance between 0.4 and 1.0 mm in said initial state.

3. A reciprocating compressor as claimed in claim 1, further comprising a stopper coupled to said cylinder block for engaging with said suction valve to limit a maximum bending of said suction valve, said suction valve being spaced from said stopper in said initial state.

4. A reciprocating compressor as claimed in claim 3, wherein said stopper is implemented by a recessed portion formed at said cylinder block.

5. A reciprocating compressor as claimed in claim 1, wherein said valve plate has a discharge port communicated with said cylinder bore, said reciprocating compressor further comprising a discharge valve attached to said valve plate for opening and closing said discharge port in response to said reciprocating movement of the piston.

6. A reciprocating compressor as claimed in claim 1, further comprising a cylinder head arranged so that said valve plate is interposed between said cylinder head and said cylinder block, said cylinder head defining a suction chamber connected to said suction port and a discharge chamber connected to said discharge port.

7. A reciprocating compressor as claimed in claim 1, wherein said cylinder block has a plurality of said cylinder bores arranged in parallel to one another and receiving a plurality of said pistons inserted therein, respectively, said pistons performing reciprocating movement with a predetermined phase difference from one another.

8. A reciprocating compressor comprising:

a cylinder block having a plurality of cylinder bores;

a plurality of pistons inserted into said cylinder bores to perform reciprocating movements, respectively;

a valve plate coupled to said cylinder block and having a plurality of suction ports communicated with said cylinder bores, respectively; and a plurality of suction valves of leaf valves placed between said valve plate and said cylinder block for opening and closing said suction ports in response to said reciprocating movements of the pistons, respectively, said suction valves being previously bent to open said suction ports, respectively, in an initial state when said compressor is stopped, said pistons performing said reciprocating movements with a predetermined phase difference from one another.

* * * * *